(12) United States Patent
Song et al.

(10) Patent No.: US 12,340,965 B2
(45) Date of Patent: Jun. 24, 2025

(54) SEMICONDUCTOR CIRCUIT BREAKER

(71) Applicant: LS ELECTRIC CO., LTD., Anyang-si (KR)

(72) Inventors: Woonghyeob Song, Anyang-si (KR); Jungwook Sim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 401 days.

(21) Appl. No.: 17/923,154

(22) PCT Filed: Mar. 29, 2021

(86) PCT No.: PCT/KR2021/003830
§ 371 (c)(1),
(2) Date: Nov. 3, 2022

(87) PCT Pub. No.: WO2021/225280
PCT Pub. Date: Nov. 11, 2021

(65) Prior Publication Data
US 2023/0223228 A1    Jul. 13, 2023

(30) Foreign Application Priority Data

May 4, 2020 (KR) .................. 10-2020-0053381

(51) Int. Cl.
*H01H 71/02* (2006.01)
*H01H 9/54* (2006.01)
*H02J 50/10* (2016.01)

(52) U.S. Cl.
CPC .......... *H01H 71/0207* (2013.01); *H01H 9/54* (2013.01); *H02J 50/10* (2016.02)

(58) Field of Classification Search
CPC ...... H01H 71/0207; H01H 9/54; H01H 71/04; H01H 71/123; H01H 71/0228;
(Continued)

(56) References Cited

U.S. PATENT DOCUMENTS 4,814,712 A * 3/1989 Burton .................. H02H 3/044
361/115
4,870,531 A * 9/1989 Danek ................ H01H 71/0228
361/679.17
(Continued)

FOREIGN PATENT DOCUMENTS

EP    2040280 A2    3/2009
JP    3768342 B2    4/2006
(Continued)

OTHER PUBLICATIONS

Notice of Allowance for related Korean Application No. 2020-00533891; action dated Dec. 28, 2022; (2 pages).
(Continued)

*Primary Examiner* — Dharti H Patel
(74) *Attorney, Agent, or Firm* — K&L Gates LLP

(57) ABSTRACT

The present disclosure relates to a semiconductor circuit breaker and, more specifically, to a semiconductor circuit breaker having a detachable interface module. The semiconductor circuit breaker according to an embodiment of the present disclosure comprises: a circuit breaker body connected to a main circuit; and an interface module which is independent from the circuit breaker body, wherein the circuit breaker body comprises: a first reception part disposed on the outer surface of the circuit breaker body; and a blocking part including a power semiconductor device connected to the main circuit to block the main circuit when an overcurrent occurs, and the interface module comprises an operation part for controlling the blocking part, and is detachably coupled to the first reception part.

16 Claims, 5 Drawing Sheets

(58) Field of Classification Search
CPC ........ H01H 9/541; H02J 50/10; H01F 7/0252;
H01F 38/14; H02H 3/08
USPC ........................................................ 361/115
See application file for complete search history.

(56) References Cited

U.S. PATENT DOCUMENTS

| | | | | |
|---|---|---|---|---|
| 4,991,042 | A * | 2/1991 | Tokarski | H02H 3/006 361/96 |
| 5,303,113 | A * | 4/1994 | Goleman | H01H 71/123 307/91 |
| 6,861,931 | B1 * | 3/2005 | Corliss | H01H 71/70 335/14 |
| 7,167,348 | B2 * | 1/2007 | Knox, Jr. | H01R 11/03 361/23 |
| 7,725,295 | B2 * | 5/2010 | Stoupis | G01R 31/58 340/657 |
| 8,120,886 | B2 * | 2/2012 | Anand | H01H 71/68 361/93.2 |
| 8,341,837 | B2 * | 1/2013 | Braunstein | H01R 25/006 324/508 |
| 8,773,827 | B2 * | 7/2014 | Kiko | H02J 13/00036 361/62 |
| 8,787,004 | B2 * | 7/2014 | Di Maio | H01H 71/123 361/601 |
| 9,025,294 | B2 * | 5/2015 | Rozman | H02H 9/001 323/282 |
| 2002/0105771 | A1 * | 8/2002 | Simms | H01H 71/46 361/115 |
| 2003/0048589 | A1 * | 3/2003 | Tignor | H02H 3/006 361/93.3 |
| 2010/0296221 | A1 * | 11/2010 | Shah | H01H 71/123 361/170 |
| 2013/0271895 | A1 * | 10/2013 | Kuhns | H02J 13/00028 361/622 |
| 2014/0192492 | A1 * | 7/2014 | Wojcik | H05K 5/0247 361/752 |
| 2014/0340822 | A1 * | 11/2014 | Lal | H02H 7/0822 361/652 |
| 2016/0163475 | A1 * | 6/2016 | Okerman | H01H 9/54 361/115 |
| 2019/0267790 | A1 * | 8/2019 | Reynolds | H01H 71/04 |

FOREIGN PATENT DOCUMENTS

| | | | |
|---|---|---|---|
| JP | 5284352 | B2 | 9/2013 |
| JP | 2016032410 | A * | 3/2016 |
| KR | 20090096368 | A | 9/2009 |
| KR | 101084790 | B1 | 11/2011 |
| KR | 101554903 | B1 | 9/2015 |
| KR | 20200122140 | A | 10/2020 |
| KR | 20210135106 | A | 11/2021 |

OTHER PUBLICATIONS

Extended European Search Report for related European Application No. 21799536.4; action dated Apr. 18, 2024; (8 pages).
International Search Report for related International Application No. PCT/KR2021/003830; action dated Nov. 11, 2021; (7 pages).
Written Opinion for related International Application No. PCT/KR2021/003830; action dated Nov. 11, 2021; (4 pages).
Office Action for related Korean Application No. 10-2020-053381, action dated Jun. 28, 2022; (4 pages).

* cited by examiner

SEMICONDUCTOR CIRCUIT BREAKER

CROSS-REFERENCE TO RELATED APPLICATIONS

The present application is a National Stage of International Application No. PCT/KR2021/003830 filed on Mar. 29, 2021, which claims priority to and the benefit of Korean Utility Model Application No. 10-2020-0053381, filed on May 4, 2020, the disclosure of which is incorporated herein by reference in its entirety.

FIELD

The present disclosure relates to a semiconductor circuit breaker, and more particularly, to a semiconductor circuit breaker having a detachable interface module.

BACKGROUND

In general, a semiconductor circuit breaker is a circuit breaker designed to break a circuit using a power semiconductor device such as a MOSFET, an IGBT, or the like. Since the semiconductor circuit breaker performs circuit breaking using the current breaking characteristic of the power semiconductor device, an arc is not generated during circuit breaking, so an arc removal function is not required. Therefore, there is an advantage that an arc extinguishing part is removed to reduce its volume. Furthermore, there is an advantage that an arc breaking time is short. On the contrary, a low-capacity circuit breaker has a disadvantage in that manufacturing cost increases due to the use of a power semiconductor device.

The semiconductor circuit breaker is often used in a system that require quick breaking. In the case of a general mechanical circuit breaker, a breaking speed thereof is several to several hundred ms, whereas a breaking speed of the semiconductor circuit breaker is several tens of μs, thereby breaking a current in a much shorter time.

Accordingly, the semiconductor circuit breaker is being actively used in a switchboard with a large current capacity, a direct current system with a rapid increase in fault current, or an energy storage system (ESS) that requires stable current supply and breaking. In recent years, considering that ignition occurs in the ESS system, the importance of a circuit breaker for stable current supply considering heat generation is becoming more urgent.

Although such a circuit breaker is sometimes used individually, it is usually installed and used in a power facility such as a switchboard or a system. In this case, it may be difficult for a user to access and operate the circuit breaker. For example, in the case of a switchboard, it is necessary to open a switchboard door to access and operate the circuit breaker from an outside of the switchboard, and it is difficult to access the circuit breaker in a case where a distance thereto within the switchboard is long.

In the related art, in order to access the circuit breaker at a long distance, a remote operation tool such as an external operation handle has been used.

FIG. 1 shows a circuit breaker having an external handle apparatus according to the related art. A drive assembly 2 is provided at an outside of a circuit breaker 1, and a handle assembly 3 having a handle 4 is separately provided to operate the circuit breaker 1 through a shaft 5.

Such an external operation handle apparatus is accompanied by inconvenience and instability of operation. Furthermore, since the circuit breaker uses a mechanical connection method, there is a limit of an operation distance to the circuit breaker. In addition, since an operation tool is separately provided, there is a risk of loss and damage. Moreover, it is difficult to recognize the internal information of the circuit breaker.

SUMMARY

The present disclosure has been made to solve the above-described problems, and an aspect of the present disclosure is to provide a semiconductor circuit breaker having an interface module that is separated from the circuit breaker to operate the circuit breaker from an outside.

A semiconductor circuit breaker according to an embodiment of the present disclosure may include a circuit breaker body connected to a main circuit; and an interface module independent from the circuit breaker body, wherein the circuit breaker body includes a first receiving part provided on an outer surface of the circuit breaker body; and a circuit breaking part having a power semiconductor device connected to the main circuit to break the main circuit when an overcurrent occurs, and the interface module includes an operation part that controls the circuit breaking part, and the interface module is detachably coupled to the first receiving part.

The interface module or the first receiving part may be provided with a coupling part including a magnet such that the circuit breaker body and the interface module are coupled by a magnetic force.

The power semiconductor device may be a MOSFET or an IGBT.

The circuit breaker body may be provided with a power supply part that supplies a current to the circuit breaking part.

The interface module may be provided with a module power supply part connected to the power supply part in a wired or wireless manner to receive power.

The power supply part may include an induced current transmitter having a first coil that generates a magnetic field, wherein the module power supply part includes an induced current receiver having a second coil through which an induced current by the magnetic field flows.

The circuit breaker body may be provided with a communication part that allows wired or wireless transmission and reception, wherein the interface module is provided with a module communication part connected to the communication part in a wired or wirelessly manner.

The circuit breaker body may be provided with an access part allowing or restricting an electrical connection to the interface module, and the interface module may be provided with a module access part that requests an electrical connection to the access part.

The operation part may include an on/off button that operates the circuit breaking part to break or connect a circuit.

The interface module may include a display part that displays the information of the circuit breaker body.

An external apparatus in which the circuit breaker body is installed may be provided, wherein the external apparatus is provided with a second receiving part on an outer surface thereof such that the interface module is detachably provided in the second receiving part.

The external apparatus may be provided with a connection part connected to the circuit breaker body in a wired or wireless manner to mediate an electrical connection between the interface module and the circuit breaker body.

A semiconductor circuit breaker according to another aspect of the present disclosure may include an external apparatus provided with a main circuit; a circuit breaker body connected to the main circuit and installed in the external apparatus; and an interface module independent from the circuit breaker body and external apparatus, wherein the circuit breaker body includes a first receiving part provided on an outer surface of the circuit breaker body; and a circuit breaking part including a power semiconductor device connected to the main circuit to break the main circuit when an overcurrent occurs, the external apparatus includes a second receiving part provided on an outer surface thereof, the interface module includes an operation part that controls the circuit breaking part, and the interface module is detachably coupled to the first receiving part or the second receiving part.

The interface module or the first receiving part or the second receiving part may be provided with a coupling part including a magnet, and the circuit breaker body and the interface module or the external apparatus and the interface module nay be coupled by a magnetic force.

The circuit breaker body may be provided with a power supply part that supplies a current to the circuit breaking part, wherein the external apparatus is provided with a second power supply part that supplies power to the circuit breaker body or the interface module, and the interface module is provided with a module power supply part connected to the power supply part or the second power supply part in a wired or wireless manner to receive power.

The power supply part or the second power supply part may include an induced current transmitter having a first coil or a second coil that generates a magnetic field, wherein the module power supply part includes an induced current receiver having a second coil through which an induced current by the magnetic field flows.

The circuit breaker body may be provided with an access part allowing or restricting an electrical connection to the interface module, and the interface module may be provided with a module access part that requests an electrical connection to the access part.

Furthermore, the external apparatus may be provided with a connection part that mediates an electrical connection between the circuit breaker body and the interface module.

According to a semiconductor circuit breaker according to an embodiment of the present disclosure, an interface module for operating a circuit breaking part may be provided separately from a circuit breaker body, thereby easily operating the circuit breaker disposed at a long distance.

The interface module may be attached to the circuit breaker body using a magnetic force coupling method, thereby facilitating coupling and decoupling.

The interface module may be connected to the circuit breaker body in a wired or wireless communication method, thereby extending an operable distance.

The circuit breaker body may be provided with an access part for allowing or restricting an access to the interface module, thereby controlling an access for each user.

The interface module may display the internal information of the circuit breaker body, and allow an electrical access as well as a mechanical connection such as operating the circuit breaking part.

DETAILED DESCRIPTION

Hereinafter, preferred embodiments of the present disclosure will be described with reference to the accompanying drawings, which are intended to describe the present disclosure in detail to allow a person skilled in the art to easily carry out the disclosure, but not to mean that the technical concept and scope of the present disclosure are limited thereto.

Figure 1:
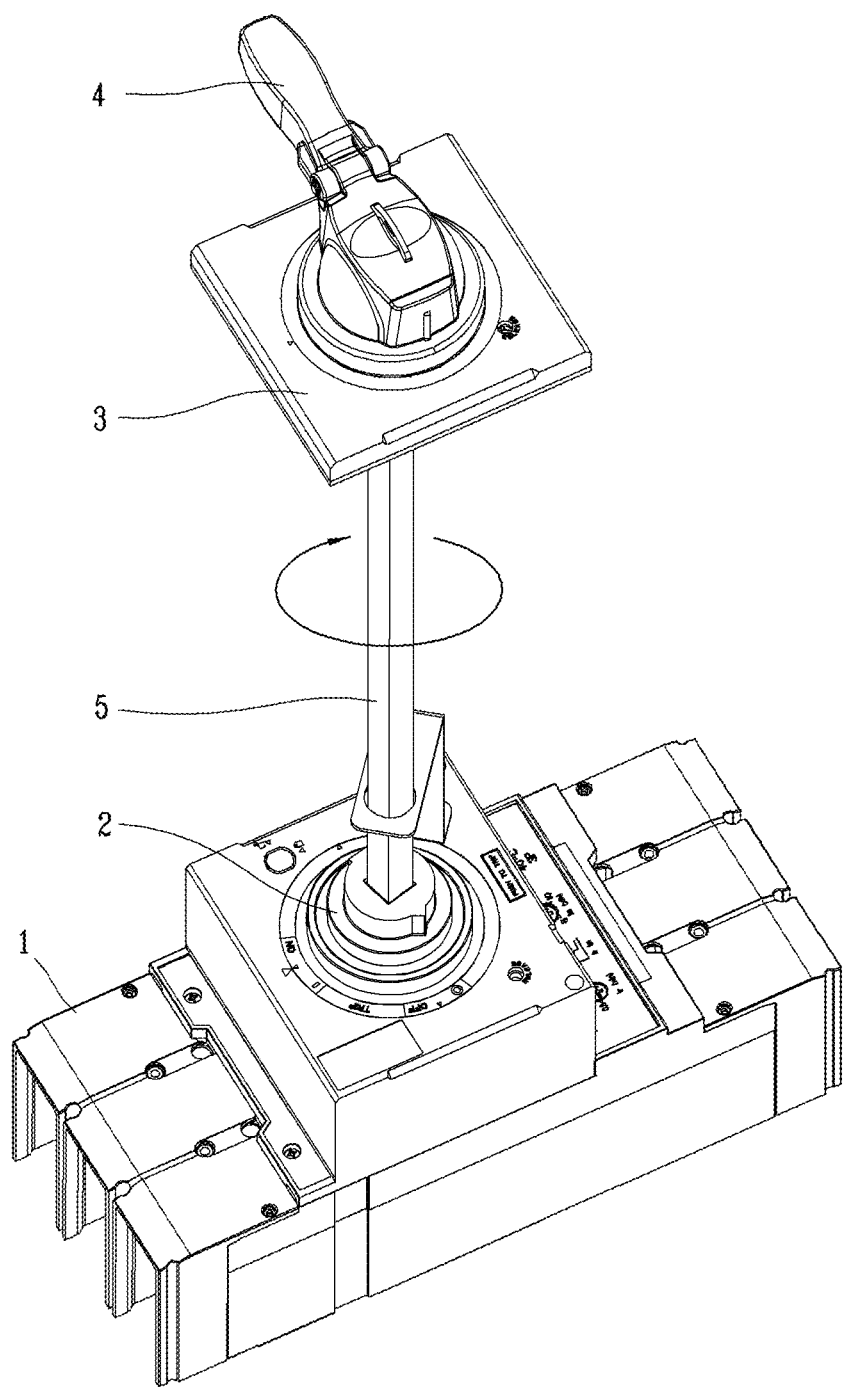
FIG. 1 is a perspective view of a circuit breaker having an external handle apparatus according to the related art.
Figure 2:
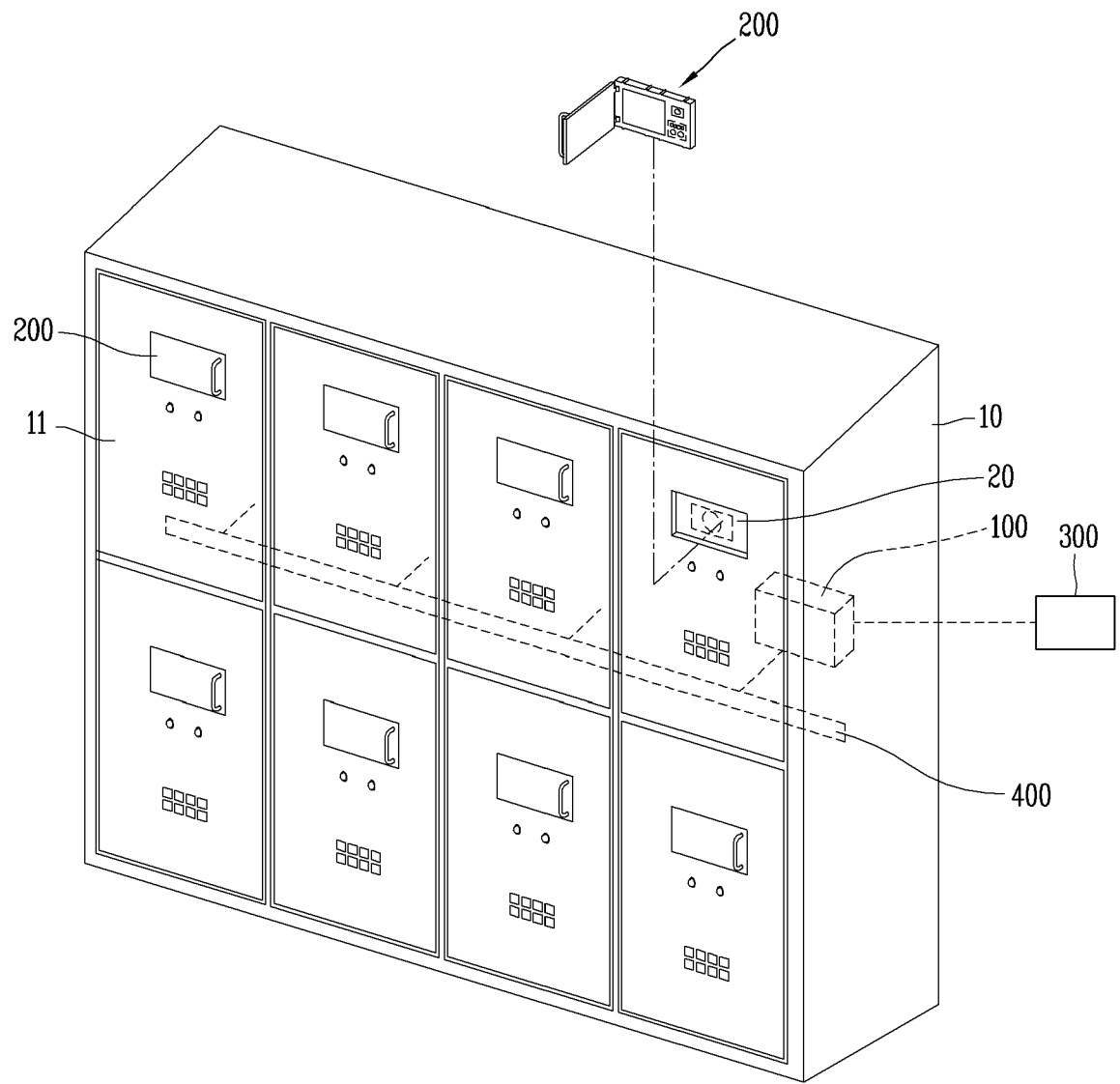
FIG. 2 is a perspective view of a semiconductor circuit breaker provided in a switchboard according to an embodiment of the present disclosure.
Figure 3:
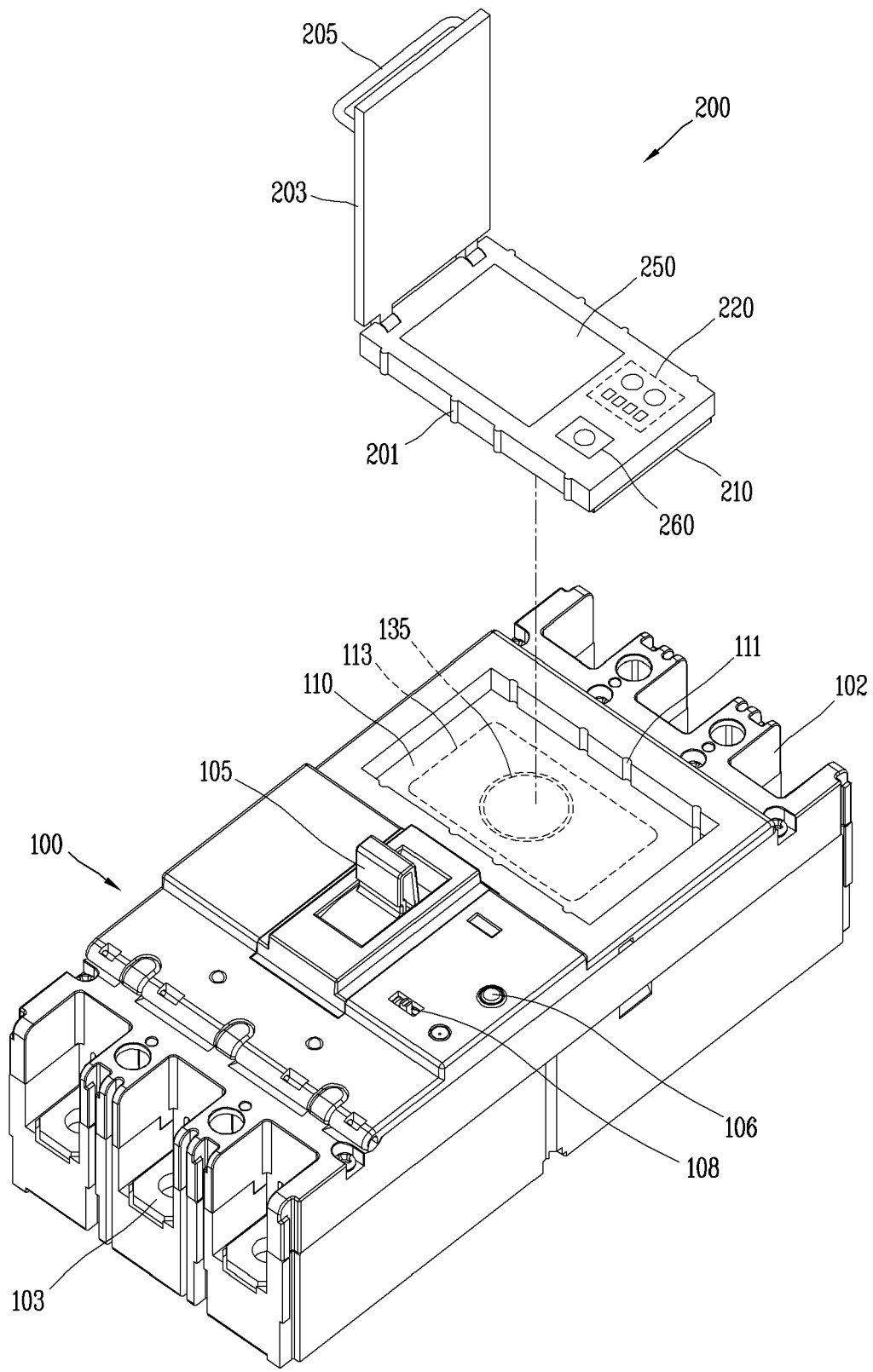
FIG. 3 is an exploded perspective view of a circuit breaker body and an interface module of a semiconductor circuit breaker according to an embodiment of the present disclosure.
Figure 4:
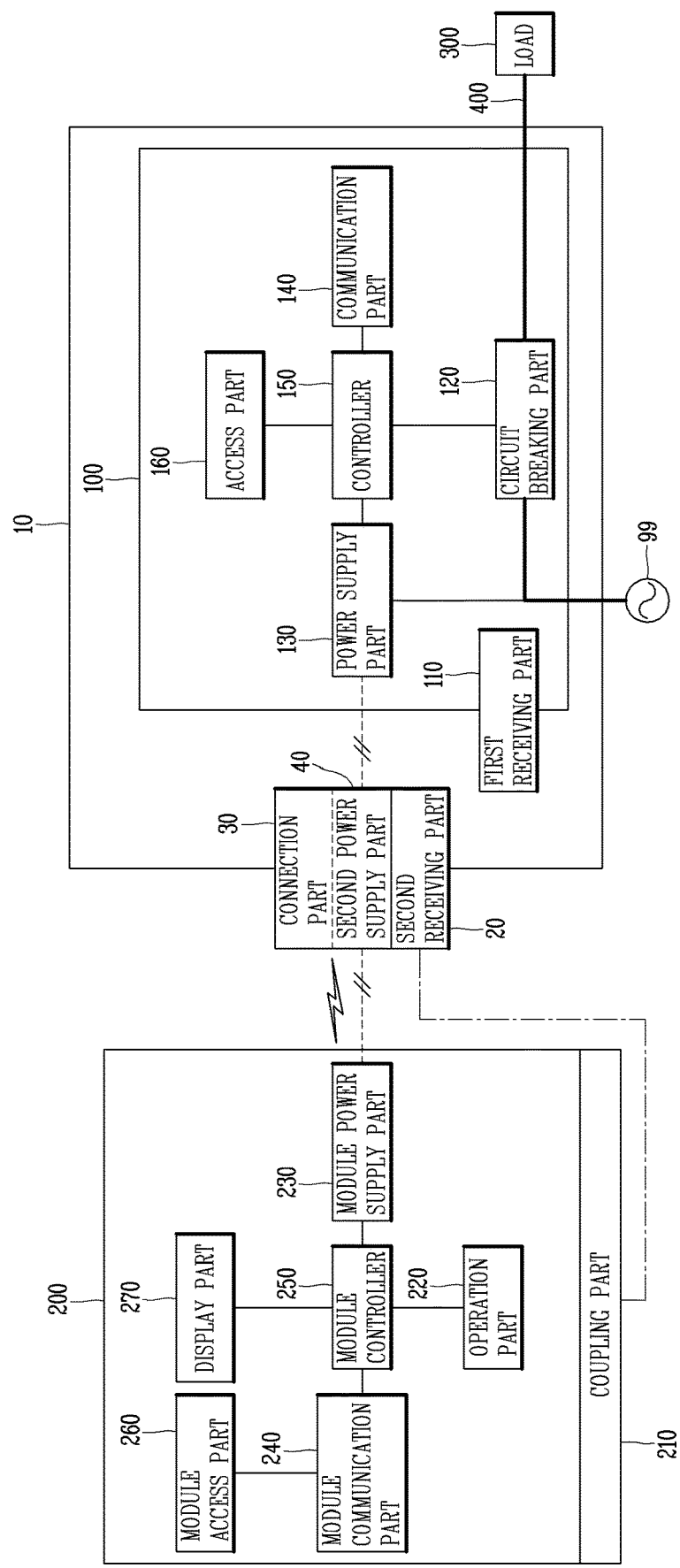
FIG. 4 is a block diagram of a semiconductor circuit breaker according to an embodiment of the present disclosure.
Figure 5:
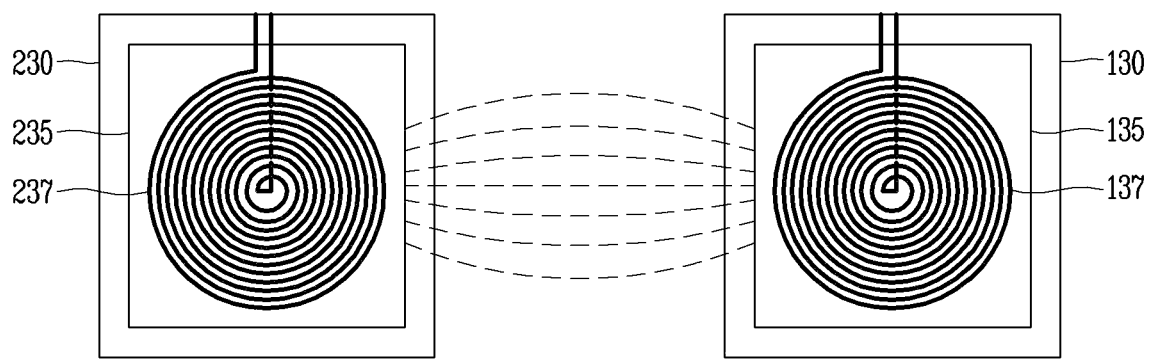
FIG. 5 is a power supply part of a semiconductor circuit breaker according to an embodiment of the present disclosure.

FIG. 2 is a perspective view of a semiconductor circuit breaker provided in a switchboard according to an embodiment of the present disclosure, FIG. 3 is an exploded perspective view of a circuit breaker body and an interface module of a semiconductor circuit breaker according to an embodiment of the present disclosure, FIG. 4 is a block diagram of a semiconductor circuit breaker according to an embodiment of the present disclosure, and FIG. 5 is a power supply part of a semiconductor circuit breaker according to an embodiment of the present disclosure. A semiconductor circuit breaker according to each embodiment of the present disclosure will be described in detail with reference to the drawings.

A semiconductor circuit breaker according to an embodiment of the present disclosure may include a circuit breaker body 1000 connected to a main circuit 400; and an interface module 200 independent from the circuit breaker body 100, wherein the circuit breaker body 100 includes a first receiving part 110 provided on an outer surface of the circuit breaker body 100; and a circuit breaking part 120 having a power semiconductor device connected to the main circuit 400 to break the main circuit 400 when an overcurrent occurs, and the interface module 200 includes an operation part 220 that controls the circuit breaking part 120, and the interface module 200 is detachably coupled to the first receiving part 110.

The circuit breaker body 100 is connected to the main circuit 400 and a load 300. The circuit breaker body 100 is open when an overcurrent occurs between the main circuit 400 and the load 300 or a fault current such as a ground fault occurs to break the main circuit 400 to protect the load 300 and apparatuses and facilities associated therewith.

The circuit breaker body 100 may be independently provided and connected between the main circuit 400 and the load 300. Furthermore, the circuit breaker body 100 is integrally installed in the external apparatus 10 to be used as an accessory apparatus.

The external apparatus 10 may be a power apparatus, for example, a switchboard or an energy storage system (ESS). FIG. 2 illustrates a switchboard including a plurality of panels 11 as an example of the external apparatus 10. Each panel 11 may be, for example, a panel divided into a high-voltage device chamber, a low-voltage device chamber, a circuit breaker chamber, a cable chamber, and the like.

Various electric power device apparatuses are installed in the panel 11.

The main circuit 400 is connected to each panel 11 and the load 300 to supply power. The main circuit 400 may be partially configured with a busbar such as a bus line and partially configured with a cable branched from the bus line. For example, a portion where a plurality of power devices are densely connected and power is intensively connected, such as a switchboard may be provided with a bus line configured with a conductor, and a portion connected to an individual apparatus may be connected with a cable.

The power element apparatuses in the panel 11 may be connected directly to the main circuit 400 or connected indirectly through other power element apparatuses.

A circuit breaker is provided to break an overcurrent or a fault current flowing in the circuit in the panel 11. For the circuit breaker applied herein, in particular, a semiconductor circuit breaker may be applied. Since breaking speed is fast and no arc is generated during breaking, the semiconductor circuit breaker is more stable than a mechanical circuit breaker.

The semiconductor circuit breaker of the present embodiment is divided into (separated into) a circuit breaker body 100 and an interface module 200.

The interface module 200 is detachably coupled to the circuit breaker body 100. That is, the interface module 200 may be independently configured, and may be coupled to or separated from the circuit breaker body 100. Here, the circuit breaker body 100 may perform a breaking function (operation) by itself, and may additionally perform a breaking function by the interface module 200. Meanwhile, the interface module 200 may perform an additional function other than the breaking function of the circuit breaker body 100.

The circuit breaker body 100 is provided with the first receiving part 110. The first receiving part 110 is provided on an outer surface of the circuit breaker body 100. The first receiving part 110 may be configured with a groove having a predetermined depth as shown in FIG. 3. However, the present disclosure is not limited thereto, and the first receiving part 110 may be configured with a flat plate or a protrusion portion.

The first receiving part 110 may be configured with a plurality of position fixing grooves 111 may be provided along a circumferential portion to allow the interface module 200 to be easily and stably inserted and installed therein.

The interface module 200 may be defined in the form of a plate or box having a predetermined thickness.

A plurality of insertion protrusions 201 may be formed in the interface module 200 to facilitate insertion into the position fixing groove 111 along the circumference and not to be shaken after installation.

A cover part 203 may be provided in the interface module 200. The cover part 203 may protect the interface module 200, prevent an arbitrary access, and allow a hand to be gripped when attaching to and detaching from the circuit breaker body 100.

A handle 205 is provided on the cover part 203. The cover part 203 may be opened and closed by the handle 205 in an opening/closing manner.

A coupling part 210 is provided on a rear surface of the interface module 200. The coupling part 210 provides a coupling force such that the interface module 200 is attached to the circuit breaker body 100 so as not to be naturally separated. Since the interface module 200 is provided with a force of the coupling part 210, it does not fall freely even when coupled in a standing state, and is not separated from the circuit breaker body 100 within a predetermined force range.

For an example of a coupling method between the interface module 200 and the circuit breaker body 100, a mechanical coupling method such as a fitting coupling structure may be applied. Furthermore, an attachment coupling method such as Velcro or a hook-and-loop fastener may be applied.

FIG. 3 illustrates a coupling method by a magnetic force as another example of a coupling method between the interface module 200 and the circuit breaker body 100. A magnet (not shown) may be provided in the coupling part 210 of the interface module 200. Meanwhile, the coupling receiving part 113 is provided in a first receiving part 110 of the circuit breaker body 100. The coupling receiving part 113 may be made of a magnetic material to be coupled by a magnetic force of the coupling part 210. For example, the coupling receiving part 113 may be made of a metal material.

Furthermore, the coupling part 210 and the coupling receiving part 113 may be configured in opposite directions. In addition, both the coupling part 210 and the coupling receiving part 113 may be configured to include a magnet.

The configuration of the circuit breaker body 100 will be described in more detail.

The circuit breaker body 100 is provided with terminal parts 12, 13 configured with a power-side terminal part 103 connected to an external power source 99 and a load-side terminal part 102 connected to the load 300. A terminal is provided in each of the terminal parts 102, 103. That is, the load-side terminal part 102 is provided to expose a load-side terminal, and the power-side terminal part 103 is provided to expose a power-side terminal.

The circuit breaker body 100 is provided with a handle 105 for manually performing a breaking operation by a user's operation. A user may manually operate the circuit breaker body 100.

A reset button 106 for re-insertion after the circuit breaker trips due to a fault current is provided on one side of the handle 105. The reset button 106 provides a reset operation for re-insertion after a trip operation.

The circuit breaker body 100 is provided with a trip display part 108 for displaying a trip state.

The circuit breaker body 100 may be provided with a configuration for performing a breaking operation and a re-insertion operation as described above at an outside thereof, and may be installed and used independently. That is, even when the interface module 200 is not connected thereto, a function may be independently performed. Such a function may be selectively provided. When the circuit breaker body 100 is applied only as a passive terminal operator, such a mechanical operation configuration may be eliminated, and configured to allow only an operation by the interface module 200. In this case, the manufacturing cost of the circuit breaker body 100 is reduced.

FIG. 4 is a block diagram illustrating a connection relationship of the external apparatus 10, the circuit breaker body 100, the interface module 200, and the load 300, and a basic configuration of respective apparatuses.

First, the circuit breaker body 100 will be described.

A power supply part 130 is provided in the circuit breaker body 100. The power supply part 130 supplies power to each component in the circuit breaker body 100 such as the circuit breaking part 120.

The power supply part 130 may be connected to the external power source 99 or may receive independent power by itself. The power supply part 130 may include an AC/DC converter or a DC/DC converter.

The circuit breaker body 100 is provided with a circuit breaking part 120.

The circuit breaking part 120 is a main contact part that breaks or connects an electrical connection of the main circuit 400. The circuit breaking part 120 is provided with a power semiconductor device (not shown) as a core device of the semiconductor circuit breaker. As such a power semiconductor device, a metal oxide semiconductor field-effect transistor (MOSFET) or an insulated gate bipolar transistor (IGBT) may be applied.

The circuit breaking part 120 may include a protection circuit (not shown) connected in parallel to the power semiconductor device to protect the power semiconductor device from a sudden voltage generated during switching. As an example of such a protection circuit, a snubber circuit or a metal oxide varistor (MOV) may be applied. For the detailed configuration or operation of the circuit breaking part and the protection circuit, reference may be made to the applicant's application "bidirectional semiconductor circuit breaker (10-2019-0042659)" and the like.

The power supply part 130 is connected to the external power source 99 to supply power to the circuit breaker body 100. Furthermore, the power supply part 130 may supply power to the interface module 200. The interface module 200 is provided with a module power supply part 230.

The power supply part 130 may be connected to the module power part 230 of the interface module 200 in a wired or wireless manner to supply power.

FIG. 5 illustrates an example of supplying power from the power supply part 130 to the module power supply part 230 in a wireless charging method.

The power supply part 130 of the circuit breaker body 100 is provided with an induced current transmitter 135. The induced current transmitter 135 is provided with a first coil 137 that generates a magnetic field.

The module power supply part 230 of the interface module 200 is provided with an induced current receiver 235 including a second coil 237 through which an induced current due to a magnetic field generated by the first coil 137 flows.

Accordingly, when the interface module 200 is coupled to the circuit breaker body 100, power may be supplied to an inside of the interface module 200 by a wireless charging method without any separate line connection.

A battery may be provided in the induced current receiver 235 of the interface module 200 to store electricity generated by the induced current.

The circuit breaker body 100 is provided with a communication part 140 to allow wired or wireless transmission and reception.

The interface module 200 is provided with a module communication part 240 connected to the communication part 140 of the circuit breaker body 100 in a wired or wireless manner. Here, for the wireless communication method, a short-range wireless communication technology such as Wi-Fi, Bluetooth, or Zigbee may be applied.

Meanwhile, the communication part 140 and the module communication part 240 may be connected to a network by accessing a communication network such as Ethernet.

The communication part 140 and the module communication part 240 may communicate with each other to transmit an access allowance and restriction, a breaking function for the circuit breaker body 100, internal information of the circuit breaker body 100, and the like.

The circuit breaker body 100 is provided with a controller 150. The controller 150 may be configured with a printed circuit board (PCB) for electrical control.

The controller 150 may be connected to a mechanical operation element such as a reset button 106 or a trip display part 108 provided on an outside of the circuit breaker body 100.

The controller 150 may be connected to the circuit breaking part 120 to control breaking and connection.

The controller 150 may provide information of the circuit breaker body 100 to the interface module 200 through the communication part 140 and the module communication part 240.

The circuit breaker body 100 is provided with an access part 160 to allow or restrict electrical connection with the interface module 200.

The interface module 200 is provided with a module access part 260 that requests a connection to the access part 160.

The module access part 260 may communicate with the access part 160 through the communication part 140 and the module communication part 240. Such communication may be controlled by the controller 150 and the module controller 250, respectively.

The access part 160 may allow, block, or restrict an access to the circuit breaker body 100 through information requested or provided by the module access part 260.

The access part 160 may confirm an ID of the interface module 200 provided by the module access part 260 and allow, block, or restrict an access to the circuit breaker body 100 based thereon.

The module access part 260 may contain authority information of the interface module 200. Alternatively, the module access part 260 may receive or provide different authorization information for each user accessing the interface module 200.

The module access part 260 may include a recognition part for distinguishing and recognizing a user accessing the interface module 200. The recognition part may be configured with a sensor such as a fingerprint sensor or an iris sensor.

In the module access part 260, respective authority information may be set differently for each user.

The operation part 220 of the interface module 200 may perform a function of operating the circuit breaker body 100. The operation part 220 of the interface module 200 includes an on/off button that operates the circuit breaking part 120 to break or connect the main circuit 400. The operation part 220 of the interface module 200 may perform an input/output function. The operation part 220 of the interface module 200 may perform a function such as information display of the circuit breaker body 100, access authority display and setting, and the operation of the circuit breaking part 120.

The interface module 200 is provided with a display part 270. The state information of the circuit breaker body 100, access authority information, whether a breaking operation is performed, whether the power supply part is charged, and the like are displayed on the display part 270.

Referring to FIGS. 2 and 4, the external apparatus 10 is configured with a second receiving part 20 on an outer surface thereof. The interface module 200 may be detachably coupled to the second receiving part 20. Although not separately indicated by reference numerals, the second receiving part 20 may also be provided with a coupling receiving part and a power supply part (induced current transmitter) like the first receiving part 110. Accordingly, the interface module 200 may receive power even in a state of being coupled to the external apparatus 10. For an example, a connection part 30 of the external apparatus 10 is provided with a second power supply part 40, and the second power supply part 40 is provided with a third coil (not shown).

The second power supply part 40 may supply power to the interface module 200 or the circuit breaker body 100.

The external apparatus 10 is provided with the connection part 30 connected to the circuit breaker body 100 in a wired or wireless manner to mediate an electrical connection between the interface module 200 and the circuit breaker body 100. Such a connection function may be selectively set. For example, the interface module 200 may be connected only mechanically to the external apparatus 10, and may be directly connected electrically to the circuit breaker body 100 in a wireless manner.

According to a semiconductor circuit breaker according to an embodiment of the present disclosure, an interface module for operating a circuit breaking part may be provided separately and independently from a circuit breaker body, thereby easily operating the circuit breaker separated apart therefrom.

The interface module may be attached to the circuit breaker body using a coupling method by a magnetic force, thereby facilitating coupling and decoupling.

The interface module may be connected to the circuit breaker body in a wired or wireless communication method, thereby extending an operable distance.

The circuit breaker body may be provided with an access part for allowing or restricting an access to the interface module, thereby controlling an access for each user.

The interface module may display the internal information of the circuit breaker body, and allow an electrical access as well as a mechanical connection such as operating the circuit breaking part.

The embodiments described above are embodiments implementing the present disclosure, and it will be apparent to those skilled in this art that various changes and modifications may be made thereto without departing from the gist of the present disclosure. Accordingly, it should be noted that the embodiments disclosed in the present disclosure are only illustrative and not limitative to the concept of the present disclosure, and the scope of the concept of the disclosure is not limited by those embodiments. In other words, the scope protected by the present disclosure should be construed by the accompanying claims, and all the technical concept within the equivalent scope of the disclosure should be construed to be included in the scope of the right of the present disclosure.

The invention claimed is:

1. A semiconductor circuit breaker comprising:
a circuit breaker body connected to a main circuit; and
an interface module independent from the circuit breaker body,
wherein the circuit breaker body comprises:
a first receiving part provided on an outer surface of the circuit breaker body; and
a circuit breaking part having a power semiconductor device connected to the main circuit to break the main circuit when an overcurrent occurs,
wherein the interface module comprises an operation part that controls the circuit breaking part, and the interface module is detachably coupled to the first receiving part,
wherein the circuit breaker body is provided with a power supply part that supplies a current to the circuit breaking part, and
wherein the interface module is provided with a module power supply part connected to the power supply part in a wireless manner to receive power.

2. The semiconductor circuit breaker of claim 1, wherein the interface module or the first receiving part is provided with a coupling part comprising a magnet such that the circuit breaker body and the interface module are coupled by a magnetic force.

3. The semiconductor circuit breaker of claim 1, wherein the power semiconductor device is a MOSFET or an IGBT.

4. The semiconductor circuit breaker of claim 1, wherein the power supply part comprises an induced current transmitter having a first coil that generates a magnetic field, and
wherein the module power supply part comprises an induced current receiver having a second coil through which an induced current by the magnetic field flows.

5. The semiconductor circuit breaker of claim 1, wherein the circuit breaker body is provided with a communication part that allows wired or wireless transmission and reception, and
wherein the interface module is provided with a module communication part connected to the communication part in a wired or wirelessly manner.

6. The semiconductor circuit breaker of claim 1, wherein the circuit breaker body is provided with an access part allowing or restricting an electrical connection to the interface module, and
wherein the interface module is provided with a module access part that requests an electrical connection to the access part.

7. The semiconductor circuit breaker of claim 1, wherein the operation part comprises an on/off button that operates the circuit breaking part to break or connect a circuit.

8. The semiconductor circuit breaker of claim 1, wherein the interface module comprises a display part that displays information of the circuit breaker body.

9. The semiconductor circuit breaker of claim 1, wherein an external apparatus in which the circuit breaker body is installed is provided, and
wherein the external apparatus is provided with a second receiving part on an outer surface thereof such that the interface module is detachably provided in the second receiving part.

10. The semiconductor circuit breaker of claim 9, wherein the external apparatus is provided with a connection part connected to the circuit breaker body in a wired or wireless manner to mediate an electrical connection between the interface module and the circuit breaker body.

11. A semiconductor circuit breaker comprising:
an external apparatus provided with a main circuit;
a circuit breaker body connected to the main circuit and installed in the external apparatus; and
an interface module independent from the circuit breaker body and external apparatus,
wherein the circuit breaker body comprises:
a first receiving part provided on an outer surface of the circuit breaker body; and
a circuit breaking part comprising a power semiconductor device connected to the main circuit to break the main circuit when an overcurrent occurs,
wherein the external apparatus comprises a second receiving part provided on an outer surface thereof,
wherein the interface module comprises an operation part that controls the circuit breaking part,
wherein the interface module is detachably coupled to the first receiving part or the second receiving part, wherein the circuit breaker body is provided with a power supply part that supplies a current to the circuit breaking part, and wherein the interface module is provided with a module power supply part connected to the power supply part in a wireless manner to receive power.

12. The semiconductor circuit breaker of claim 11, wherein the interface module or the first receiving part or the second receiving part is provided with a coupling part comprising a magnet, and the circuit breaker body and the interface module or the external apparatus and the interface module are coupled by a magnetic force.

13. The semiconductor circuit breaker of claim 11, wherein the external apparatus is provided with a second power supply part that supplies power to the circuit breaker body or the interface module.

14. The semiconductor circuit breaker of claim 13, wherein the power supply part or the second power supply part comprises an induced current transmitter having a first coil or a second coil that generates a magnetic field, and wherein the module power supply part comprises an induced current receiver having a third coil through which an induced current by the magnetic field flows.

15. The semiconductor circuit breaker of claim 11, wherein the circuit breaker body is provided with an access part allowing or restricting an electrical connection to the interface module, and wherein the interface module is provided with a module access part that requests an electrical connection to the access part.

16. The semiconductor circuit breaker of claim 11, wherein the external apparatus is provided with a connection part that mediates an electrical connection between the circuit breaker body and the interface module.

* * * * *